K. E. PEILER AND E. H. LORENZ.
TRANSFER MECHANISM FOR GLASS SHAPING MACHINES.
APPLICATION FILED APR. 22, 1918.

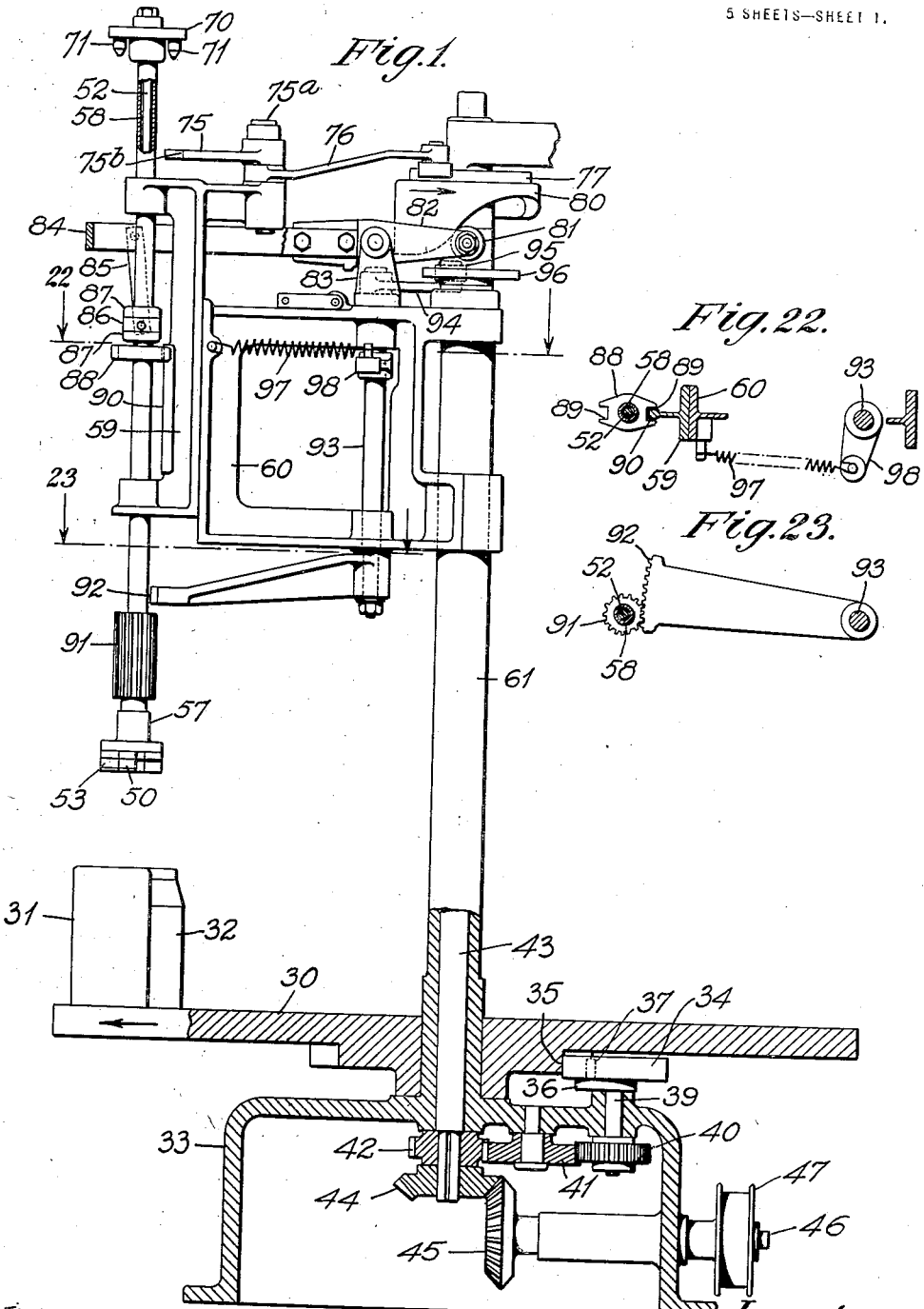

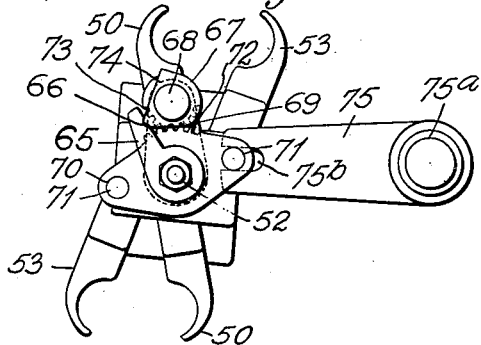
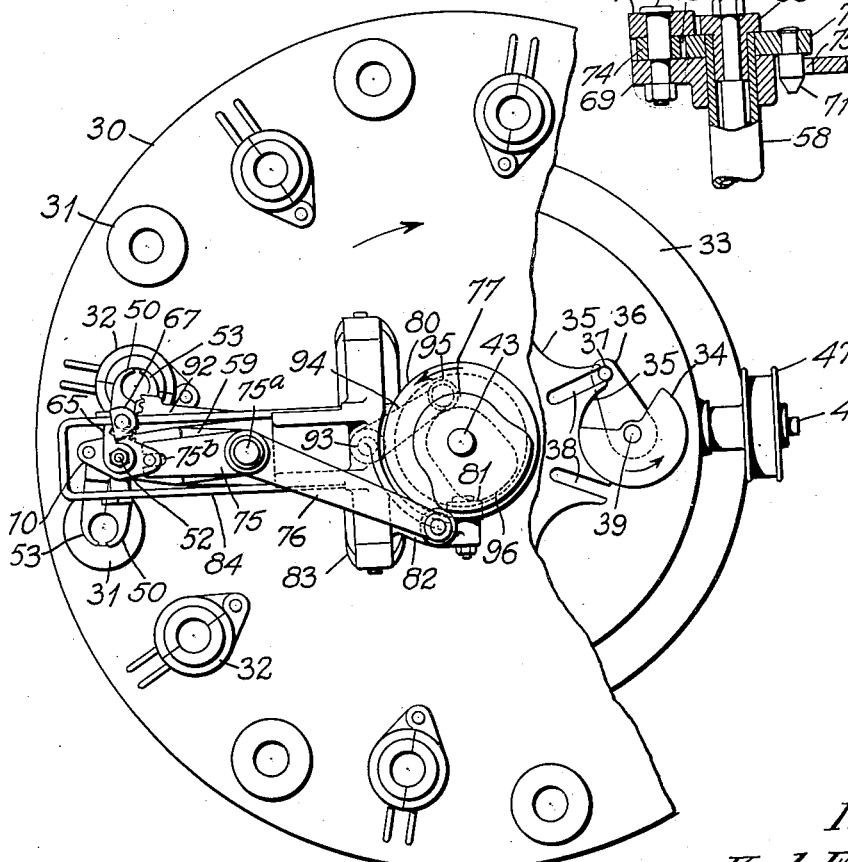

1,331,472.

Patented Feb. 17, 1920.
5 SHEETS—SHEET 3.

Witness:
S. S. Grotta

Inventors:
Karl E. Peiler
Edward H. Lorenz
by W. H. Smith, Atty.

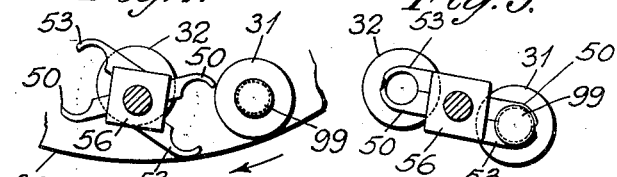
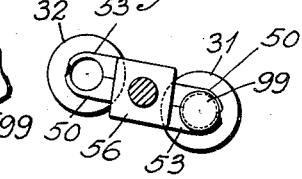
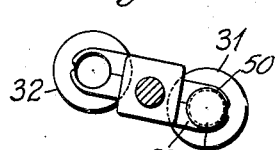
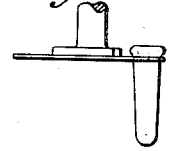
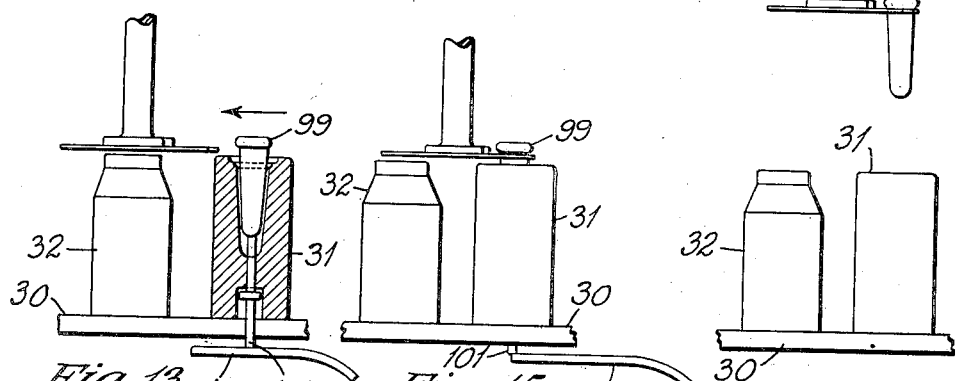
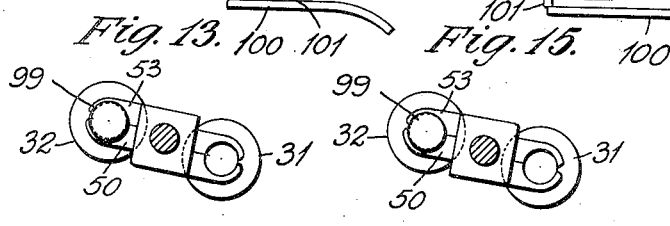
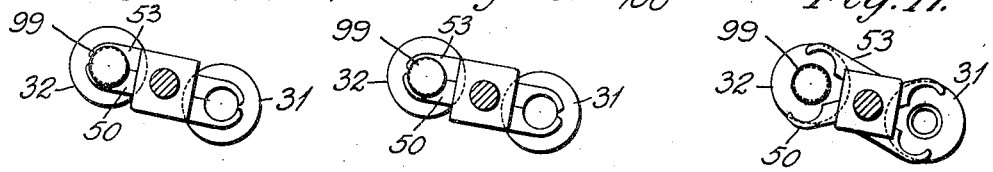
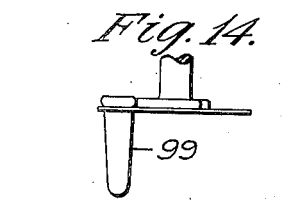
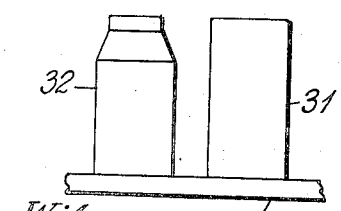
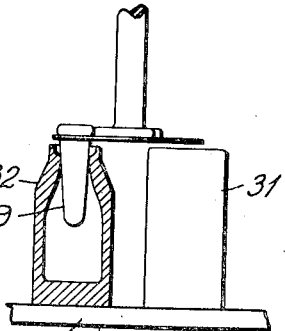
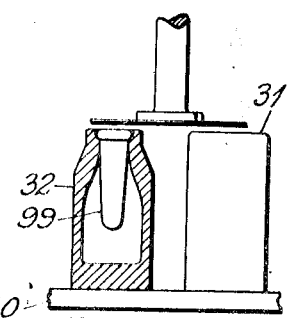

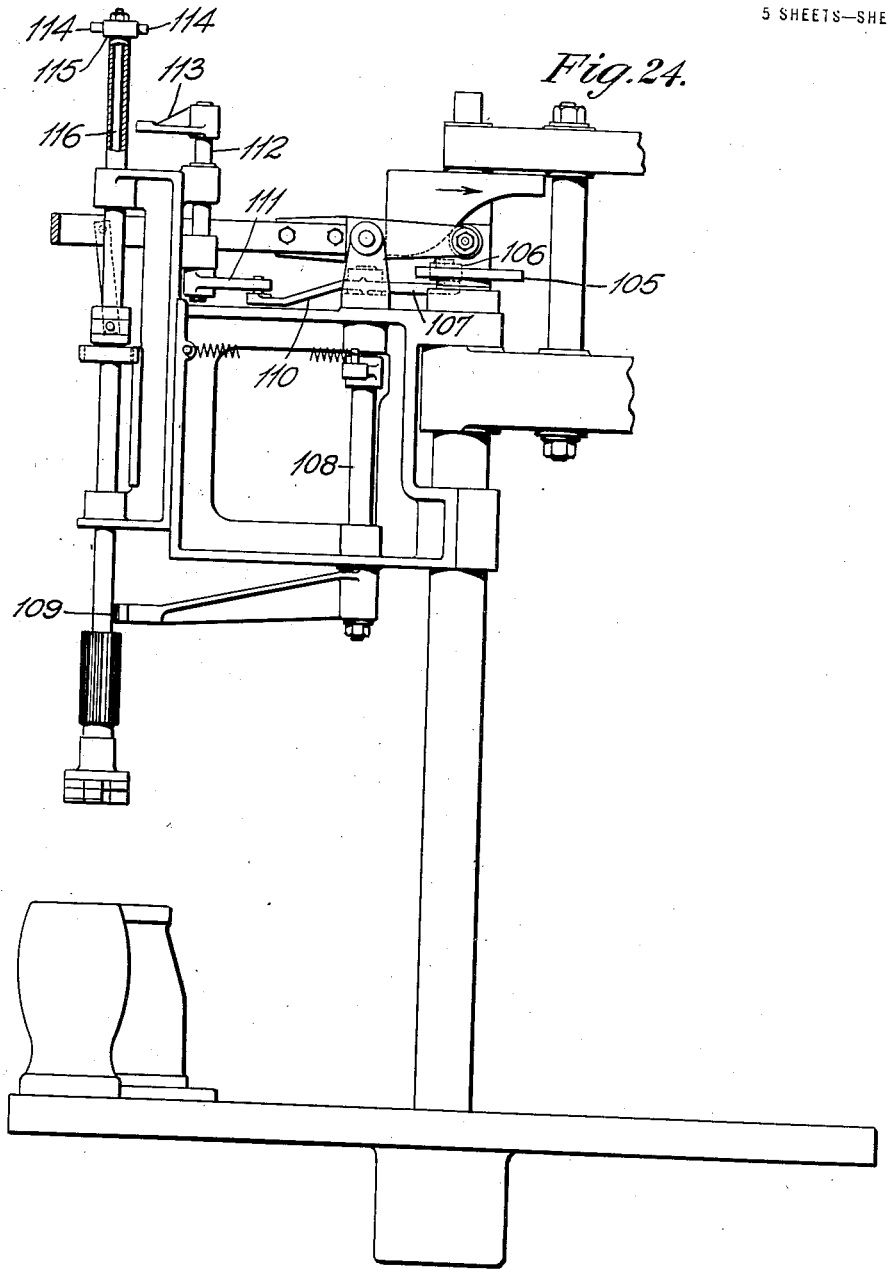

UNITED STATES PATENT OFFICE.

KARL E. PEILER AND EDWARD H. LORENZ, OF WEST HARTFORD, CONNECTICUT, ASSIGNORS TO HARTFORD-FAIRMONT COMPANY, OF CANAJOHARIE, NEW YORK, A CORPORATION OF NEW YORK.

TRANSFER MECHANISM FOR GLASS-SHAPING MACHINES.

1,331,472. Specification of Letters Patent. Patented Feb. 17, 1920.

Application filed April 22, 1918. Serial No. 229,893.

*To all whom it may concern:*

Be it known that we, KARL E. PEILER and EDWARD H. LORENZ, citizens of the United States, residing at West Hartford, in the county of Hartford and State of Connecticut, have invented new and useful Improvements in Transfer Mechanism for Glass-Shaping Machines, of which the following is a specification.

This invention relates to the manufacture of glassware, including glass bottles and similar articles, into which the molten glass is shaped by successive steps or stages, the object of the invention being to provide simple automatic mechanism for transferring the glass "blanks" from one position to another on the glass shaping machine, for their successive operations.

This invention, although adapted to a wide range of use is herein specifically illustrated as applied to a type of glass shaping machine having a rotatable table carrying several sets of molds, each set comprising a blank mold and a blow mold, for shaping the bottles or other ware. The blanks or parisons are first formed in a blank mold and then transferred to an adjacent blow mold, in which the bottle is completed by well-known blowing operations, and is then removed by other well-known devices, which are outside of the present invention.

Figure 3:
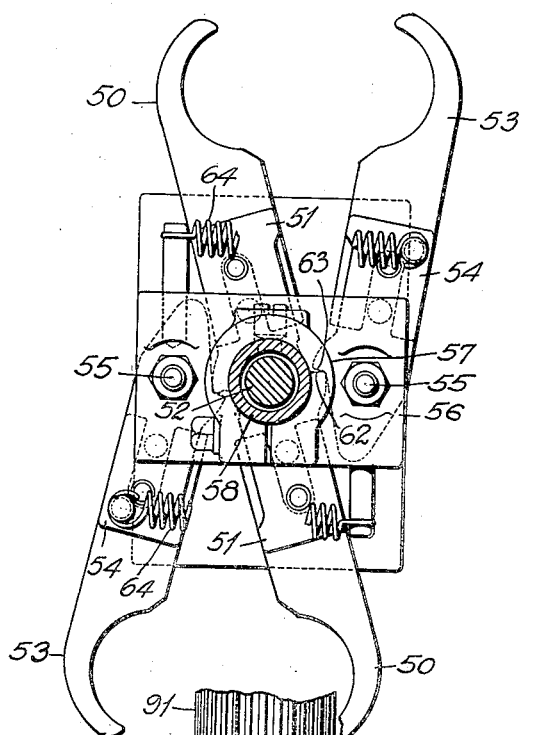
Figure 4:
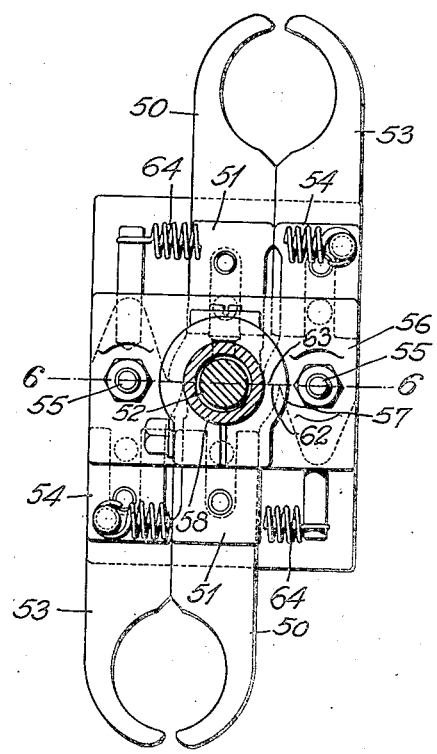
Figure 6:
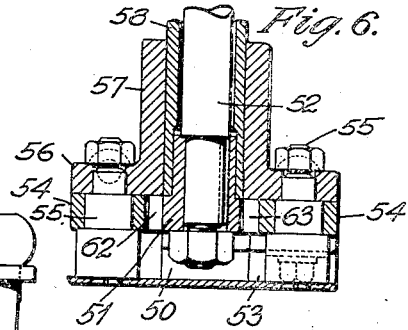

Figure 1 of the drawings shows a side elevation of a transfer mechanism which embodies this invention, arranged in connection with a rotatory mold table on which is shown one blank mold and one blow mold. Fig. 2 shows a plan of the transfer mechanism and a portion of the mold table, and mechanism for giving the table an intermittent rotatory movement. Fig. 3 shows on larger scale a plan of the transfer tongs in open position. Fig. 4 shows a similar view of the transfer tongs in closed position. Fig. 5 shows a side elevation of the transfer tongs in closed position and supporting a blank. Fig. 6 shows a vertical section, on the plane indicated by the dot and dash line 6—6 on Fig. 4. Figs. 7–18 inclusive are diagrammatic views illustrating the operation of the transfer mechanism. Fig. 7 is a plan with the transfer tongs opened to receive a blank from a blank mold. Fig. 8 is an elevation of the parts shown in Fig. 7, with the blank mold in section. Fig. 9 is a plan with the transfer tongs closed on a blank in the blank mold. Fig. 10 is a side view of what is shown in Fig. 9. Fig. 11 is a plan and Fig. 12 an elevation with the transfer tongs closed on a blank and elevated above the blank mold. Fig. 13 is a plan and Fig. 14 is an elevation with the transfer tongs rotated so as to transpose its blank holding devices, and carry the blank over the blow mold. Fig. 15 is a plan and Fig. 16 an elevation, with the blow mold in section, showing the transfer tongs lowered for depositing the blank in the blow mold. Fig. 17 is a plan and Fig. 18 an elevation, with the blow mold in section, showing the blank deposited from the opened tongs into the blow mold. Fig. 19 shows a plan with the transfer tongs held open. Fig. 20 is a plan showing the transfer tongs closed. Fig. 21 is an elevation, with some parts shown in section, of the members shown in Fig. 20. Fig. 22 is a section on the plane indicated by the dotted line 22 on Fig. 1. Fig. 23 is a section on the plane indicated by the dotted line 23 on Fig. 1. Fig. 24 is an elevation showing a modified arrangement of the cams for operating the transfer mechanism.

The transfer mechanism is illustrated in the drawings as adapted to operate in connection with a machine having a rotary table 30 carrying eight blank molds 31 and eight blow molds 32, these molds being arranged in pairs around the table. This table is mounted on a base 33 and is given an intermittent rotatory movement so as to advance the molds from station to station, by any suitable means. The mechanism shown for this purpose is of the nature of a Geneva stop mechanism, and it consists of a rotary disk 34 with a curved edge arranged to conform to the curved edges of the plate 35 secured to the underside of the table, and an arm 36 carrying a pin 37 which is designed to enter the slots 38 in the plate as the disk and arm rotate. The arbor 39 carrying the disk 34 and arm 36, is provided with a gear 40 which through the medium of the intermediate gear 41 is driven by the pinion 42 that is keyed to the lower end of the shaft 43. A bevel gear 44 is also keyed on the lower end of the shaft and this bevel gear is driven by a bevel gear 45 on a shaft 46 carrying a driving pulley 47, (Figs. 1–2.) This mechanism intermittently moves the table for carrying the molds from station to station and permitting the drops or charges of molten glass to be deposited in the blank molds, shaped into blanks, transferred from the blank molds to the blow molds, blown, and carried by the blow molds until they are cooled and set, and removed from the blow molds in any usual manner, not shown herein.

The transfer mechanism herein illustrated includes a rotating carrier, the axis of which is mounted in a fixed position midway between the centers of each pair of blank and blow molds, when the latter are stationary at their transferring station. The carrier is provided with multiple pairs or sets of blank holding devices, which by the partial rotations of the carrier are successively moved into receiving relation to the successive blanks, as the latter are brought to the transferring station by the rotation of the table. By each of these partial rotations of the carrier, a blank is transferred from its blank mold to an adjacent blow mold. When used with the solid or integral form of blank mold herein shown, an axial movement is also imparted to the carrier in order to lift the blank out of its blank mold and to lower it again into the blow mold. This axial movement is not necessary in some cases, as for example when used in conjunction with sectional hinged molds which open sidewise. This transfer carrier is provided with two oppositely disposed pairs or sets of blank holding devices, forming in effect double ended or duplex tongs, which are rotated 180 degrees at each transferring movement, thus transposing and reversing the position of the blank holding devices at each half rotation, the blank and blow molds being disposed in their stopping positions or stations immediately below the respective blank holding devices of the carrier.

The carrier consists of a tubular shaft 58 which is supported for rotation and endwise movement by its bearings in a bracket 59 attached to the frame 60 which is mounted on the post or column 61, supported by the base 33 of the machine (Fig. 1), and substantially concentric therewith. Since the axes of the mold table 30 and column 61 are coincident, the transfer device may be swung about the column to alter the transferring station to any desired position around the mold table. A corresponding change in the time of operation of the tongs should be made and this is readily accomplished by a resetting of the actuating cams or shifting the toothed relation of the gears which coordinate the movements of the transfer mechanism and the mold table. Secured to the lower end of the tubular shaft 58 by means of its hub 57, is a carrier plate 56, on which are mounted the blank holding devices. These may be simple forks, or of any construction suited to the form of the various blanks, or to other varying conditions. When it is desired to open and close them, they may each consist of paired jaws, one or both of which are adapted to open and close. As herein shown, both jaws of each pair are made to open and close, and are in effect double ended tongs consisting of jaws 50 and 53 which are removably mounted upon bars 51 and 54 respectively for convenience in changing the jaws for different sizes of blanks. The bars 54 are pivotally mounted at 55 upon the plate 56 (Figs. 3, 5, 6) and the bar 51, carrying their co-acting jaws 50 is secured to the lower end of a vertical rod 52, which extends upwardly through the tubular shaft 58, to operating connections for turning the rod 52. On the bar 51, which carries the jaws 50, are two shoulders 62 engaging with shoulders 63 on the blocks 54, which carry the jaws 53. Springs 64 are arranged to draw the jaws together. When the rod 52, to which the bar 51 is attached, is turned in one direction, the shoulders 62 and 63 coact to force the jaws apart against the pressure of the springs (Fig. 3); and when the rod is free, the springs pull the jaws together (Fig. 4).

Means are provided for latching the tongs in their open position. Fastened to the upper end of the rod 52 is a finger 65 provided on one edge with a notch 66. (Figs. 19, 20, 21). Engaging with this finger is a latch 67 that is mounted on a stud 68 carried by an arm 69 which is fastened to the upper end of the tube 58. Turning loosely on the upper end of the tube is a yoke 70 that has downwardly projecting pins 71 and in one edge is provided with gear teeth 72. These gear teeth mesh with gear teeth 73 in the edge of a block 74 that is fastened to the underside of the latch 67. If this yoke is turned in one direction the latch is turned so as to push the finger and rotate the rod 52. This opens the tong jaws. When the tong jaws are fully opened the end of the latch enters the notch in the finger and latches the jaws open, Fig. 19. When the yoke is turned in the other direction the latch releases the finger and rod 52 and allows the tong jaws to close, Fig. 20. This turning movement is given to the yoke by the rocker arm 75 when one of the pins 71 is in the slot 75$^b$ in the end of the arm, Fig. 21. The rocker arm 75 is mounted on a fixed stud 75$^a$, and is connected with a lever 76 that is oscillated by the cam 77 attached to the shaft 43. Figs. 1, 2. The mechanisms are so timed that this opening and closing of the tongs occurs only when the tong jaws are down to a position just above the top of the molds, Figs. 8, 10, 16 and 18.

The tube 58 which carries the tongs and the rod by which the tongs are opened and closed is raised and lowered (Figs. 8 and 12) at the proper time by the cam 80 fixed on the shaft 43. This cam engages a roller 81 on a rocker lever 82, pivotally supported by a bracket 83 on the frame 60, and carrying a U shaped extension 84, connected by links 85 with a collar 86 which is mounted loosely on the tube 58 between the thrust collars 87, (Figs. 1 and 2). This mechanism raises and lowers the tube and the tongs without interfering with their rotation. That rotation, in the embodiment here shown, takes place only in their raised position. (Figs. 12, 14). At other lower positions, the tongs are prevented from turning by means of a guide block 88 which is attached to the tube 58 and is provided with two oppositely disposed grooves 89 corresponding in position with the reversed rotary positions of the tongs (Fig. 22). These grooves fit the fixed guide 90 which extends outwardly from a portion of the tube-supporting bracket 59. The guide 90 does not extend upwardly the entire length of the vertical movement of the block 88, leaving it free to be rotated in its upper position. While the block is thus engaged by the guide the tube and tongs are held against rotation, with the tongs in register with one of the stopping positions of the molds. As the block 88 in its upward movement nears the upper end of the guide 90, a gear 91 fixed to the tube 58 is carried into mesh with the segmental gear 92, by means of which the tongs are rotated. This gear is fastened to the lower end of a rock shaft 93, supported by bearings in the frame 60. On the upper end of this shaft is a cam arm 94, having on its end a roll 95 engaging with a cam 96 on the shaft 43. A spring 97 arranged between the frame and an arm 98 extending from the shaft 93 holds the roll against the cam. At the transferring period the cam 96 acting through the lever 94, shaft 93, segment gear 92, and gear 91, rotates the tube and the tongs 180 degrees.

This blank transferring mechanism is set in a position which locates the tongs in register with each successive pair of the molds 31 and 32 at one of their stopping positions (Figs. 2, 9, 11). As these molds approach that stopping position (Figs. 7, 8) the tongs are lowered and opened, the blow mold 32 passing beneath the tongs. Meanwhile the blank 99 is raised out of its mold 32 by any suitable means, such as a pin 101 riding on a cam 100 so as to raise the head of the blank above the level of the tongs. In this position the blank is carried forward into the open jaws of the tongs, coming to rest at the position shown in Figs. 9 and 10, in which the tongs are closed upon the blank, by the operation of the cam 77 acting through the arms 75 and 76 upon the yoke 70 as above described. The tongs then rise, lifting the blank out of the blank mold, (Figs. 11 and 12,) after which the tongs are rotated 180 degrees to their reversed position, thus carrying the blank over the blow mold, (Figs. 13, 14.) In this position the cam 80 allows the tongs to be lowered, (Figs. 15 and 16) whereupon the tongs are opened, releasing the blank and allowing it to drop into the blow mold, (Figs. 17 and 18). The table is then advanced to a succeeding station, at which the blank is blown by any well known means.

Meanwhile, the sector gear 92, released from the gear 91 is swung by its cam 96 back to its first position, which enables it, upon re-engagement with the gear 91, to turn the tongs forward another half revolution at their succeeding operation.

After releasing the blank, the tongs are preferably raised far enough above the molds to clear the blank, if the latter should be slightly misplaced, or should for any reason fail to drop fully to its proper position in the blow mold, and also to clear any mechanisms or other obstructions, between the molds, which might otherwise collide with the tongs, which are then lowered again in time to receive the succeeding blank as shown in Figs. 7 and 8. If desired, instead of maintaining the molds at rest during the time of the blank transferring operation, the table may be rotated just after the blank has been raised clear of the blank mold, and during the rotation of the tongs so that the blank will be delivered not to the preceding, but to the following or subsequent blow mold. This may be readily accomplished by properly setting the actuating cams and altering the tooth relation of the actuating gears, since they are driven by the same power shaft.

The duplex or double ended construction of the tongs avoids the necessity of turning them through a complete rotation at each transferring operation, or of reversing their rotative movement. This construction, in conjunction with the location of the tongs relative to the molds also allows the blank to pass into the tongs through their open ends, as illustrated in Figs. 7 and 8, and also allows the transferred blank to pass out between the open end of the tongs from the position shown in Fig. 17, without necessarily raising the tongs, even if the blank should fail to drop fully into its mold 32. This construction, arrangement, and timing enables the tongs to be worked with moderate and easy movements.

In the mechanism thus far described one cam 77 is employed for opening the tongs, and another cam 96, is employed for rotating the tongs. This separation of the two functions, and of the mechanism, enables the timing of each to be modified to a considerable degree without affecting each other. Where such modification or variation of time is not considered necessary, the construction may be simplified by performing these two functions by a single cam 105, as shown in Fig. 24. That cam engages with a roll 106 on a lever 107, which is fixed to a shaft 108 carrying the segment gear 109, corresponding in function and mode of operation with the sector gear 92 of the previous figures. The opening and closing of the tongs is effected by the extension 110 of the cam arm 107 engaging with an arm 111 fixed on the lower end of a vertical shaft 112, which is mounted in suitable bearings and is provided at its upper end with an arm 113 adapted to engage either of the pins 114, projecting from a block 115. That block is attached to the shaft 116 which extends downwardly through a tube, corresponding with the tube 58 of the previous figures, and operates as described in connection with those figures to open and close the transferring tongs, the construction, function and mode of operation of which are like those previously described, with the exception that in the construction of Fig. 24, the tongs are not latched in their open position, but are opened only while one of the pins 114 is in engagement with the arm 113, being closed at all other positions.

The various features of this invention may be modified and rearranged in various ways within the skill of a competent designer of this class of machinery to adapt it to various uses and conditions.

We claim as our invention:—

1. In combination, a rotating mold support carrying a plurality of pairs of blank and blow molds, a supporting column about which said support rotates, a transfer device mounted on said column for transferring blanks from one mold to another mold on said support, including oppositely disposed blank holding devices arranged to register respectively with the blank to be transferred and with the desired position of the blank, and automatic means actuated in a predetermined order and time for transposing the blank holding devices to effect said transfer.

2. In combination, a rotating mold support carrying a plurality of blank and blow molds, a central column about which said support rotates, a transfer mechanism, mounted on said column for transferring blanks from one position to another on said machine, provided with oppositely disposed blank holding devices, means for registering the said holding devices with said positions respectively, and means for transposing the blank holding devices to effect said transfer.

3. In combination, a rotating mold support carrying a plurality of pairs of blank and blow molds, a central column about which said support rotates, mechanism mounted on said column above said mold support for transferring successive blanks from one of said molds to another, provided with a pair of revoluble blank holding devices disposed on opposite sides of their axis of revolution and operating means therefor including mechanism for revolving the said devices to successively reverse their position.

4. In combination, a rotating mold support carrying a plurality of blank and blow molds, a central column about which said support rotates, apparatus mounted on said column above said support for transferring blanks from one of said molds to another, provided with a pair of revoluble holding devices symmetrically disposed on opposite sides of their axis of revolution, and means for operating the apparatus, including means for positioning the respective holding devices in register with the said positions, and means for imparting successive half revolutions to said holding devices to transfer the successive blanks from one mold to another.

5. In combination, a mold support carrying a plurality of blank and blow molds, a central column about which said support rotates, apparatus mounted on said column above said support and projecting outwardly and downwardly above the path of travel of the said molds, for transferring blanks from one of the said molds to another, provided with a pair of revoluble blank holding devices disposed symmetrically on opposite sides of their axis of revolution, and means for operating said apparatus including means for revolving said device half way around to effect the said transfer.

6. In combination, a rotating support carrying a plurality of blank and blow molds, a central column about which the said support rotates, apparatus mounted on said column and above said table and independent of the said molds for transferring blanks from one mold to the other, provided with oppositely disposed blank holding devices disposed over the path of travel of the said molds, and automatic means actuated in a predetermined order and time for transposing the blank holding device to effect the said transfer.

7. In combination, a rotating mold support carrying a plurality of blank and blow molds, a central column about which said support rotates, oppositely disposed blank holding devices supported by said column and above said mold support and arranged to register respectively with a stopping position of the said molds, and mechanism timed with the mold revolutions for transposing the blank holding devices to effect the transfer of the blank from one mold to another when the said molds are at a stopping position.

8. In combination, a rotating mold support carrying a plurality of blank and blow molds, a central column about which said support rotates, a transfer apparatus mounted on said column and above said mold table locating at a stopping position of the molds and provided with oppositely disposed blank holding devices registering with the respective molds of each set when the latter are at said stopping position, and mechanism synchronized with the revolving movement of the molds to transpose the blank holding device, and thereby transfer the blanks of successive sets from one mold to the other.

9. The combination, with a glass shaping machine having an intermittently rotating table, provided with a plurality of sets of molds, each set comprising a blank mold and a blow mold, of blank transferring apparatus located adjacent to a stopping position of the molds, and provided with oppositely disposed blank holding devices mounted for rotation upon an axis located between the two molds of each set when at their stopping position, and mechanism synchronized with the intermittent rotations of the table for revolving the blank holding devices to transfer blanks from one mold to the other of the successive sets.

10. In combination, a rotating mold support carrying a plurality of blank and blow molds, a central column about which said support rotates, blank transferring means mounted on said column and above said support for transferring glass blanks from one position to another, consisting of double ended tongs having two sets of jaws disposed in the two said positions, means for opening and closing the tong jaws, and means for rotating the tong jaws to transpose the said positions of their sets of jaws.

11. In combination, a rotating mold support carrying a plurality of blank and blow molds, a central column about which said support rotates, means mounted on said column and above said support for transferring glass blanks from a blank mold to a blow mold, consisting of double ended tongs having one set of jaws disposed over a stopping position of a blank mold, and another set of jaws disposed over a stopping position of a blow mold, means for opening and closing the jaws, means for rotating the tongs to transpose the said positions of its jaws, and thereby effect the transfer.

12. In combination, a rotating support carrying a plurality of blank and blow molds, a central column about which said support rotates, means adjustably mounted on said column and above said support for transferring glass blanks from a blank mold to a blow mold consisting of double ended tongs having one set of jaws disposed over a stopping position of a blank mold and another set of jaws disposed over a stopping position of a blow mold, means for opening and closing the jaws, means for rotating the tongs to dispose the said positions of its jaws, and means for raising and lowering said tongs in conjunction with its rotative movement.

13. In combination, a vertical standard, a mold support movable about said standard, means for imparting a rotary movement to said support about said standard, a blank mold and a blow mold mounted on said support, a blank transferring mechanism adjustably mounted on and for positioning around said standard, duplex tongs having one set of jaws over a stopping position of the blank mold and another set of jaws over a stopping position of the blow mold, means for opening and closing the tong jaws, means for rotating the tongs from one mold position to the other mold position, and means for raising and lowering said tongs.

14. In a glass shaping machine, the combination of a central column, a movable mold support carried by said column and provided with pairs of molds, each pair comprising a blank mold and a blow mold, automatic means for imparting rotary movements to said support for carrying the pairs of molds from station to station, a blank transferring device mounted on said column and above said support, and adapted to be swung about said column, concentrically with the path of travel of said molds, including duplex tongs arranged above one of said stations, automatic means for opening and closing the tongs, means for rotating the tongs and means for raising and lowering the tongs.

15. In a glass shaping machine, the combination of a vertical column, a mold support movable about said column and carrying blank and blow molds, automatic means for imparting a revolving movement to said support, a blank transferring mechanism adjustably mounted on said column and above said molds including duplex tongs having two sets of jaws disposed above resting positions of said molds, means for opening and latching open the tong jaws, means for closing the tong jaws, means for rotating the tongs to transpose the position of its jaws, and means for raising and lowering the tongs.

16. In a glass shaping machine, the combination of intermittently traveling molds, apparatus for transferring glass blanks from one of said molds to another of said molds, while the said molds are at rest, including duplex tongs, means for raising and lowering the tongs, means for rotating the tongs and latching means for holding the said tongs open while the said molds travel.

17. The combination with a plurality of movable molds, of mechanism for raising a mass of glass out of one of said molds and lowering it into another of said molds, and means for raising said mechanism immediately subsequent to the delivery of the glass to the last named mold to clear the said mold and the glass therein when the said mold is moved.

18. The combination, with glass shaping apparatus, of a transferring device including tongs mounted for opening and closing and for raising and lowering movement, means for opening the tongs at a position in its range of vertical movement, and a latch device for holding the tongs open while away from said position.

19. The combination, with glass shaping apparatus, of transfer devices including tongs mounted for opening and closing and for raising and lowering movements, means for opening the tongs at their lowered position, and a latch device for holding the tongs open when raised away from their lowered position.

20. Transfer mechanism for a glass shaping machine, comprising tongs with jaws at each end, a shaft carrying said tongs, means for raising and lowering said shaft, means for rotating said shaft, a cam and connections for opening and closing said tongs, and a latch for retaining the tongs in open position.

21. Transfer mechanism for a glass shaping machine, comprising tongs with grasping jaws at each end, a tubular shaft carrying one of said jaws at each end of the tongs, a rod within the tubular shaft carrying the other of said jaws at each end of the tongs, means for raising and lowering the tongs, means for turning the shaft and rod together, and means for turning the rod independently of the shaft to operate the jaws.

22. Transfer mechanism for a glass shaping machine provided with grasping jaws at each end, a tubular shaft carrying one of said jaws at each end of the tongs, a rod within the tubular shaft carrying the other of said jaws at each end of the tongs, springs for closing the jaws, means for turning the rod independently of the tubular shaft, and means on the jaws carried by the rod for opening the jaws when the rod is turned in one direction and permitting the jaws to close when the rod is turned in the other direction.

Signed at Hartford, Connecticut this 19th day of April 1918.

KARL E. PEILER.
EDWARD H. LORENZ.